UNITED STATES PATENT OFFICE.

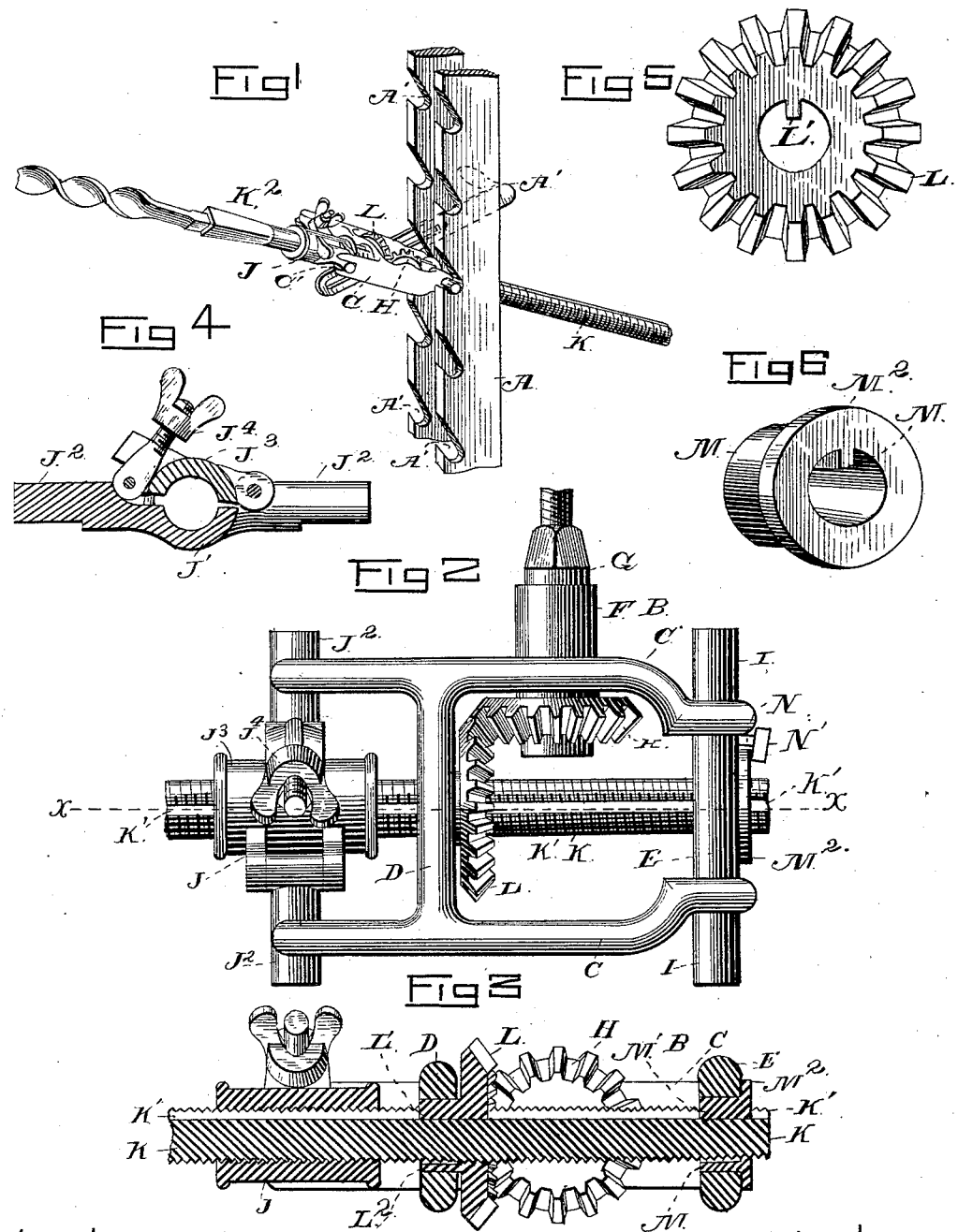

JOHN HAMMER AND XAVIER KERN, JR., OF WEST BROOKFIELD, OHIO; SAID HAMMER ASSIGNOR TO SAID KERN.

ROCK-DRILLING MACHINE.

SPECIFICATION forming part of Letters Patent No. 318,727, dated May 26, 1885.

Application filed November 24, 1884. (No model.)

*To all whom it may concern:*

Be it known that we, JOHN HAMMER and XAVIER KERN, Jr., citizens of the United States, residing at West Brookfield, in the county of Stark and State of Ohio, have invented certain new and useful Improvements in Rock-Drilling Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to mining-machines, and aims to provide a simple, easily-operated, and efficient machine; and the invention consists in certain novel constructions, combinations, and arrangements of parts, all of which will be hereinafter described and claimed.

In the drawings, Figure 1 is a perspective view of our machine, a portion of the supporting-frame being broken away. Fig. 2 is a plan view of the main frame. Fig. 3 is a section on line $x$ $x$, Fig. 2. Fig. 4 is a transverse section of the threaded barrel. Fig. 5 is a detail face view of the rotating gear. Fig. 6 is a detail perspective view of the bearing-collar.

The supporting-frame A may be of any suitable construction, provided with a series of notches or bearings, A', for the trunnions of the main frame, presently described.

The main frame B is formed with the side bars, C, the cross-bar D, and the base-bar E. The cross-bar is arranged slightly nearer the front than the rear end of the frame.

A bearing, F, is formed on and through one of the side bars for the drive-shaft G, on the inner end of which is secured a bevel drive-gear, H.

Trunnions I I project laterally from the frame near its rear end, and are seated in the operation of the machine in the notches A', and the frame may be rocked on its trunnions to adjust it to any desired angle.

Notches C' are formed in the forward end of the bars C, to receive the lateral arms of the threaded barrel. This threaded barrel J is composed of the main section J', having lateral arms $J^2$ $J^2$, and the section $J^3$, hinged at one edge to the main section, and provided at its opposite edge with a latch or fastening, $J^4$. This barrel has an internal thread fitted to that of the feed-screw, which may be easily placed in and removed from the barrel by unfastening the hinged section thereof, as will be understood from the preceding description.

The feed-screw K has a longitudinal groove or keyway, K', and is adapted at one end, $K^2$, to receive a drill-bit or cutter, as shown in Fig. 1.

The rotating gear L is placed on the screw K, and has a key, L', projected into the groove K', so that the revolution of the gear will effect a revolution of the screw. This rotating gear is arranged on the rear side of the cross-bar through which the screw is projected, and it has a stem, $L^2$, which is journaled in an opening through the bar D. This rotating gear is meshed with the drive-gear H, from which it receives its motion, which it in turn imparts to the feed-screw by means of key L', operating in the keyway K'.

A feed-screw opening is formed through the base-bar E of the main frame.

A bearing-collar, M, is journaled in this opening, and is provided with a key, M', which projects into the keyway K' of the feed-screw. The feed-screw turns this collar, and the latter receives the frictional wear of the rotation. To secure this collar to the main frame so it may be conveniently removed, I provide it at one end with a radial flange, $M^2$, which projects beyond the screw-opening. A retaining-screw, N, is turned into the main frame and adjacent the periphery of the flange $M^2$. The head N' of this screw extends over the periphery of the flange N' and retains the bearing-collar in the main frame, at the same time permitting its full revolution, as is desirable.

The operation of our machine will be understood from the foregoing description. A crank or other suitable expedient is attached to the drive-shaft, and such shaft is rotated, driving the gear L, and by it the screw, which, turning through the threaded barrel, is properly fed forward, as will be understood.

While we prefer to use the operating means described, it is manifest that a crank or other expedient could be secured on the rear end of the feed-screw by which to operate it. The bearing-collar and the threaded barrel serve to guide the feed-screw and keep same in proper line, as will be understood.

Having thus described our invention, what we claim, and desire to secure by Letters Patent, is—

1. In a mining-machine, a main frame consisting of side bars rigidly united by a cross bar or bars, and having at one end seats or bearings for the threaded barrel, and at its opposite end lateral trunnions fitted to be journaled in the supporting-frame, combined with the supporting-frame and the threaded barrel, substantially as set forth.

2. The combination, in a mining-machine, of the main frame provided with an opening for the passage of the feed-screw, the feed-screw inserted through said opening and provided with a longitudinal groove or keyway, the collar provided with a key fitting into the groove or way of the screw and inserted into the screw-opening in the main frame, and provided at one end with a radial flange extended laterally beyond the screw-opening, and a retaining-screw turned into the main frame and provided with a head extended laterally over the flange of the bearing-collar, substantially as and for the purposes specified.

3. The combination, in a mining-machine, of the main frame provided in its forward end with notches or seats, and with trunnions extended laterally from its rear end, and having a cross-bar and base-bar connecting its side bars, the feed-screw, the threaded barrel having lateral arms seated in the notches of the main frame, the rotating gear journaled in the cross-bar and keyed to the feed-screw, the drive-gear, and the bearing-collar journaled in the base-bar and keyed to the feed-screw, substantially as set forth.

4. The combination of the main frame provided in its forward end with seats or notches, and having trunnions projected laterally from its rear end, and having its base-bar provided with a feed-screw opening, the threaded barrel having lateral trunnions held in the notches or seats, the feed-screw, and the bearing-collar placed on the feed-screw and provided with a radial flange, and the retaining-screw turned into the main frame and having its head extended over the radial flange of the bearing-collar, substantially as set forth.

5. The combination, in a mining-machine, of the main frame provided with an opening for the passage of the feed-screw, the feed-screw inserted through said opening and provided with a longitudinal groove or keyway, the bearing-collar provided with a key fitting into the groove of the screw, and journaled and held in the screw-opening in the main frame, substantially as set forth.

In testimony whereof we affix our signatures in presence of two witnesses.

JOHN HAMMER.
XAVIER KERN, JR.

Witnesses:
  ISAAC ULMAN,
  VICTOR KERN.